A. VAN LEEUWEN.
AUTOMOBILE EXTRICATING ATTACHMENT.
APPLICATION FILED NOV. 1, 1920.
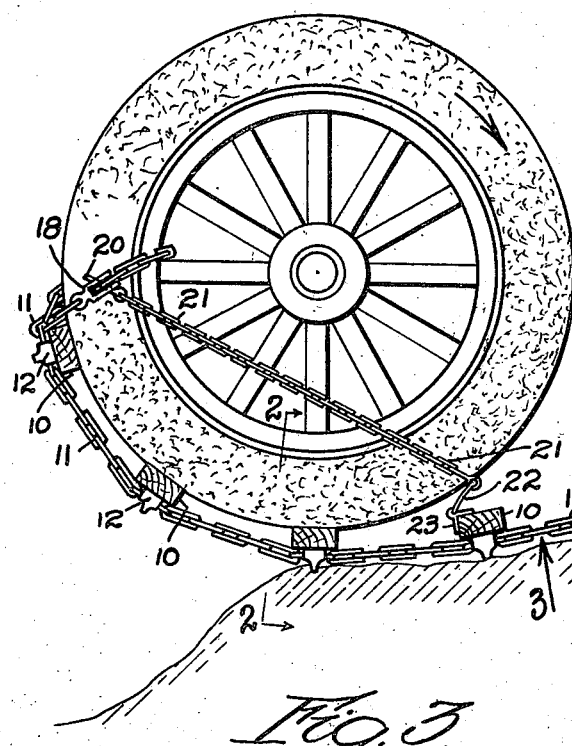
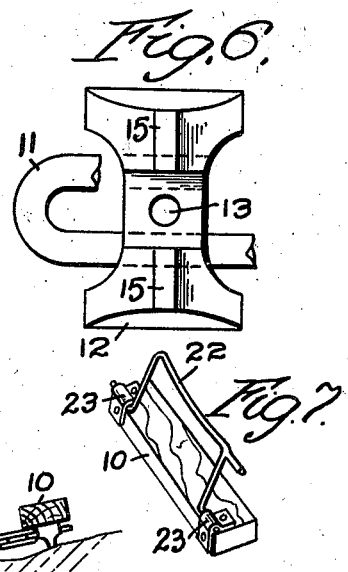
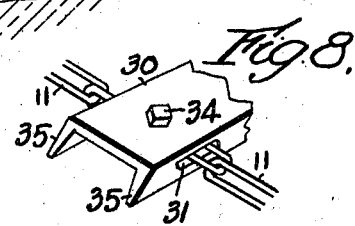
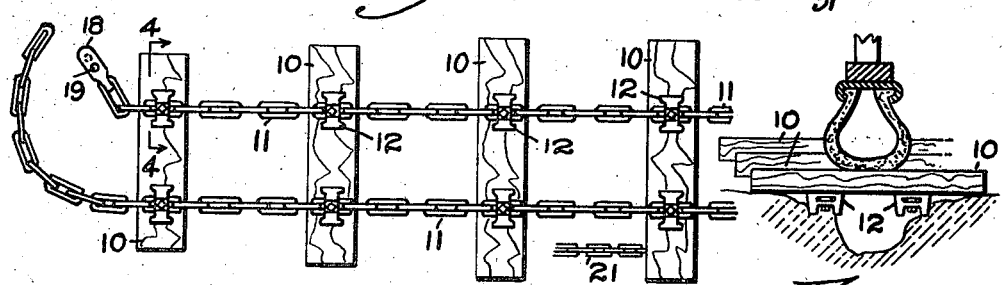
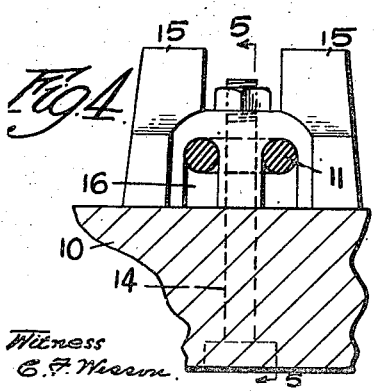
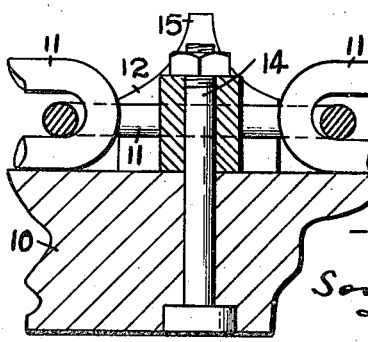

Patented Sept. 19, 1922.

1,429,305

UNITED STATES PATENT OFFICE.

ADRIAN van LEEUWEN, OF WORCESTER, MASSACHUSETTS.

AUTOMOBILE EXTRICATING ATTACHMENT.

Application filed November 1, 1920. Serial No. 420,999.

*To all whom it may concern:*

Be it known that I, ADRIAN VAN LEEUWEN, a citizen of the United States, residing at Worcester, in the county of Worcester and State of Massachusetts, have invented a new and useful Automobile Extricating Attachment, of which the following is a specification.

This invention relates to an apparatus for use in extricating automobiles and other vehicles, especially trucks, from ruts, holes, and the like.

The principal objects of the invention are to provide a structure for furnishing a series of supports or bridges over a rut or hole on which the wheel can be supported to enable it to be rolled out on the level ground; to provide a construction in which the supports on which the wheel is to be carried will be wide enough to furnish a substantially level surface for supporting the wheel and will be so designed that if the wheel is in a long rut it will come up out of it with a gradual rise.

The invention also involves means whereby the attachment will be adapted to penetrate into snow, ice or soft ground to secure a firm hold, and means for automatically detaching the device before it winds all the way around the wheel to prevent injury to the mud-guards or sides of the vehicle.

The invention also involves improvements in several details of construction as will appear.

Reference is to be had to the accompanying drawings, in which—

Fig. 1 is a side elevation showing an automobile wheel being elevated out of a depression by means of a preferred embodiment of this invention;

Fig. 2 is a sectional view looking in the direction of the arrows in Fig. 1 taken on the line 2—2;

Fig. 3 is a bottom plan of the attachment;

Fig. 4 is an elevation of one of the elements of the device;

Fig. 5 is a sectional view on the line 5—5 of Fig. 4;

Fig. 6 is a detail bottom plan view of one of the spurs;

Fig. 7 is a perspective view of part of the detaching device, and

Fig. 8 is a perspective view of a modification.

I am aware of the fact that devices have been proposed for attachment to wheels to assist in enabling them to grip the ground to help them out of a rut or hole or slippery place. These devices are usually intended to wind up on the wheel and then remain on it while the wheel is taking several turns, and in fact may be left on the wheel throughout the remainder of the trip.

My invention is designed for accomplishing their objects, but also for additional purposes. The principal problem I have in mind is the extrication of trucks from depressed ruts in snow and ice, although the invention is capable of use for getting trucks and other vehicles out of the mud or out of any slippery or depressed position. Usually when a vehicle, particularly a truck, is stopped on account of the wheels getting down into a rut in the ice, snow or mud there is a comparatively long depression in which a wheel is located and the problem is to get over to the side thereof. The prior devices above mentioned are not intended for accomplishing that object, but merely to provide a gripping surface for action on the slippery surface of the street.

In the form shown the invention comprises a series of bars 10 which can conveniently be formed of wood as shown in Fig. 3 or of channel iron as shown in Fig. 8. In the wooden construction these bars are all much wider than the tire is, so that they will bridge any rut along which the device is placed. I prefer also that while several of these bars shall be of maximum length, those near one end shall be somewhat shorter, and I have indicated in Fig. 3 the first three bars at the left as of gradually increasing length, and the bars at the right all of the maximum length. These bars are connected by a pair of chains 11 located farther apart than the sides of the tire of the wheel and of a length less than its circumference.

These chains are connected to the bars by means of a plurality of metal pieces 12. Each one of these has a perforation 13 through the center for the reception of a bolt 14, and is shown as having two projections 15 constituting spurs located on each side of the bolt. Each one has a double recess 16 in its upper side which is next to the bar 10 above it. This recess is for receiving a link of the chain 11. If a chain of the character shown is used, the recess is placed somewhat below the bottom of the bar 10 and the two links adjacent to it hold the link in this recess 16 at the bottom thereof. It will be seen that two of these pieces 12 are located on the bottom of each bar 10 and that the bars are spaced equally apart along the chains.

The two chains 11 are continued beyond the shortest bar 10 so that one of them can be drawn around the tire in through the space between two spokes. The end of this chain consists of an ordinary link. The end of the other chain is provided with a special connection 18 which is provided with a slanting perforation 19 through it. This connection is bifurcated for the reception of the end link of the other chain between the two parts.

For the purpose of connecting this end link with the connection 18 a pin 20 is employed. This is provided with a chain or other flexible connection 21 which extends back to a rocking loop 22 pivoted on two brackets 23 on one of the bars 10.

In the form shown in Fig. 8 the channel bar 30 takes the place of the wooden bar 10. The chains which connect these bars pass through slots 31 in the sides and are secured by bolts 34. The side walls 35 of the channel bar constitute spurs or gripping jaws corresponding with the spurs 15.

In the use of the device whether in the forms shown or otherwise, it is to be presumed that the wheel is down in a rut or other depression in snow, ice or mud. The attachment shown herein is laid out in front of the wheel to which it is to be applied and the end of one of the chains 11 is swung around the tire, brought through between the spokes, and then brought into registration with the connection 18, and the pin 20 is placed in position through the end link and the connection 18. The pull on the chain 11 is sufficient to hold these parts in position after once being so placed.

At this time the chain 21 lies flat along the attachment at the top. The loop 22 can turn far enough forward to permit of this location. Now the motor is started and the wheel starts to rotate in the direction of the arrow in Fig. 1. The first bar 10, not being as long as the rut is wide, sinks down part way into the rut and facilitates the travel of the wheel on to its upper surface as the wheel rotates. It is not intended that the attachment shall travel along the ground for the spurs dig in and ordinarily prevent such motion. The wheel mounts the first bar and, when once on it, will roll along on the next. This is usually located at a higher elevation on account of the fact that it is longer and projects further to each side of the rut. Finally the wheel mounts the device far enough to rest on the bars which extend clear across the top of the rut and the vehicle can be turned entirely out of the rut to the level of the roadway.

At about this time when the wheel is supported on the third bar and is swinging over toward the fourth one, the tire will engage the pivoted loop 22 as indicated in Fig. 1. Further movement of the vehicle forward swings this loop down against the bar on which it is located. This creates a direct pull on the chain 21 and draws the pin 20 out of the connection 18. In this way the end of the attachment is released from the wheel and the vehicle passes along over the attachment, leaving it in the road just where it was placed originally. In other words, the usual difficulty of detaching the device when it is full of mud or snow is entirely avoided, and the attachment can be picked up from the roadway at leisure and put away in a convenient place in the vehicle.

Although I have illustrated and described only two forms of the invention I am aware of the fact that other modifications can be made therein without departing from the scope of the invention as expressed in the claims. Therefore I do not wish to be limited to all the details of construction herein shown and described, but what I do claim is:—

1. In an attachment for a vehicle wheel for the purpose described, the combination of a series of parallel bars spaced apart, chains for flexibly connecting them together, projections on the lower surfaces of the bars near the ends for engaging the roadway, said projections having passages therethrough for the reception of said chains, and means for preventing longitudinal motion of the chains in said passages.

2. In an attachment for a vehicle wheel for the purpose described, the combination of a series of parallel bars spaced apart, chains flexibly connecting them together, and projections on the outer lower surfaces of said bars secured to the bars detachably and constituting means for holding the chains for connecting the bars.

3. A device for use in extricating vehicles from ruts, holes and the like, comprising a series of transverse bars spaced apart, flexible means for connecting them together in parallel relation and means for attaching the end of the device to a wheel tire, and means for automatically disengaging it from the tire before it is wound all the way around.

4. A device of the character described for use in extricating vehicles from ruts, holes and the like, the combination of a series of transverse bars spaced apart, means for connecting them together in parallel relation, a flexible connection at one end of said device by which that end can be attached to a tire or wheel, said flexible connection comprising two end members and a pin for temporarily holding said end members together, and means for automatically withdrawing the pin when the device is wound a predetermined distance around the wheel or tire to release it therefrom.

5. In a device of the character described, the combination of a series of transverse bars spaced apart, means for connecting them together in parallel relation, a connection at one end of said device by which that end can be attached to a tire or wheel, a pin for temporarily holding said connection in position, and means for automatically withdrawing the pin when the device is wound a predetermined distance around the wheel or tire to release it therefrom, said means comprising an actuating member adapted to be moved when the wheel rolls to a definite point and a flexible member for connecting it with said pin.

In testimony whereof I have hereunto affixed my signature.

ADRIAN van LEEUWEN.